United States Patent [19]

Olson

[11] Patent Number: 4,551,339
[45] Date of Patent: Nov. 5, 1985

[54] METHOD AND APPARATUS FOR OBTAINING A CONCENTRATED EXTRACT FROM LIQUID SMOKE

[76] Inventor: Jay Olson, P.O. Drawer C, Crossville, Tenn. 38555

[21] Appl. No.: 591,890

[22] Filed: Mar. 21, 1984

Related U.S. Application Data

[63] Continuation of Ser. No. 347,907, Feb. 11, 1982, abandoned.

[51] Int. Cl.⁴ .......................... B01D 9/04; A23L 1/221
[52] U.S. Cl. .................................... 426/384; 426/314; 426/651; 426/652; 62/541; 62/545; 210/774; 210/784
[58] Field of Search ................. 210/784, 774; 426/68, 426/314, 384, 651, 652, 655; 62/532, 541, 544, 545

[56] References Cited

U.S. PATENT DOCUMENTS

| | | | |
|---|---|---|---|
| Re. 27,670 | 6/1973 | Miler | 426/314 |
| 1,914,742 | 6/1933 | Hillier | 210/784 |
| 2,081,296 | 5/1937 | Gard | 210/784 |
| 2,670,295 | 2/1954 | Ash | 426/316 |
| 2,765,235 | 10/1956 | Wenzelberger | 426/444 |
| 2,815,288 | 12/1957 | McKay | 426/384 |
| 2,889,931 | 6/1959 | Buttolph | 210/784 |
| 3,091,335 | 5/1963 | Goard | 210/784 |
| 3,289,838 | 12/1966 | Garrett | 210/784 |
| 3,445,248 | 5/1969 | Miler | 426/652 |
| 3,873,741 | 3/1975 | Melcer | 426/650 |

Primary Examiner—Ernest G. Therkorn
Attorney, Agent, or Firm—Herbert L. Bello

[57] ABSTRACT

A method and apparatus for producing a concentrated extract from an ice crystal-fluid solution by suction separation of the ice crystal solvent. A multiple compartment drum is rotatably mounted within a tank containing the solution, a filter medium covering the compartments. A vacuum source selectively creates a suction in the compartments to draw the solution through the filter medium, the ice crystals remaining on the filter medium and the fluid passing into the compartments. The ice crystals are scraped from the filter medium and the fluid is recycled for further processing.

2 Claims, 3 Drawing Figures

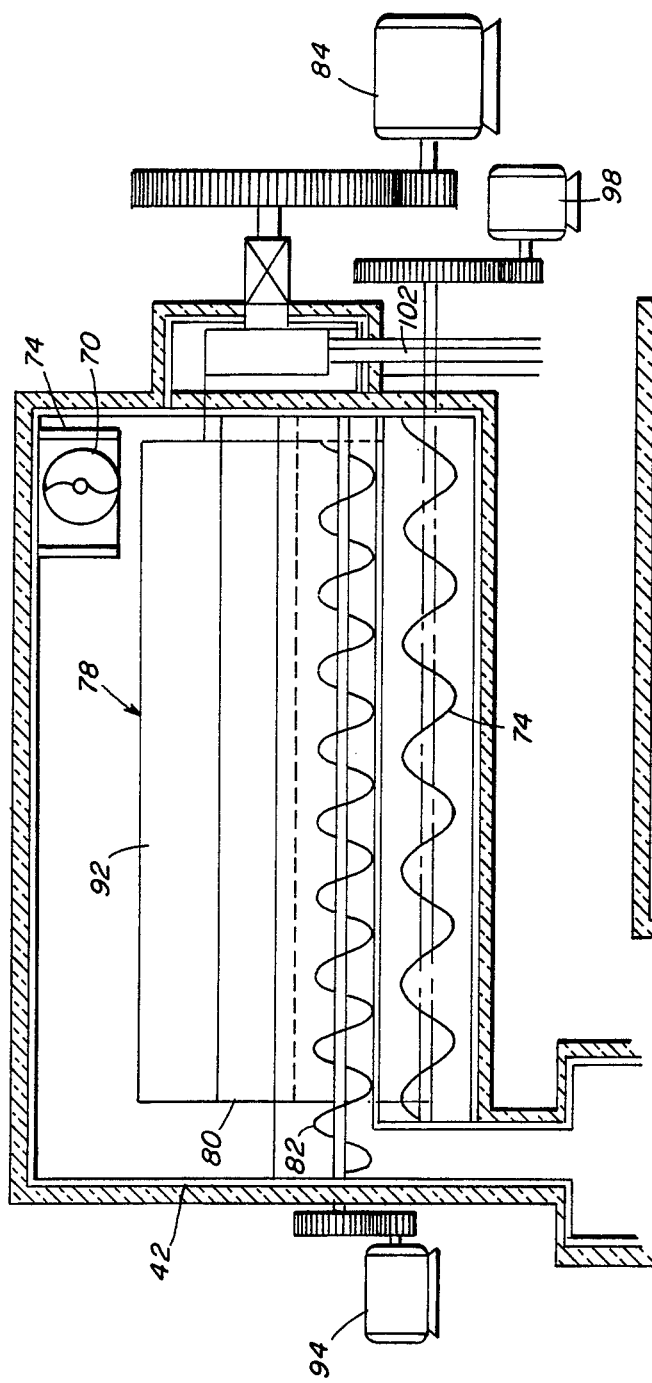
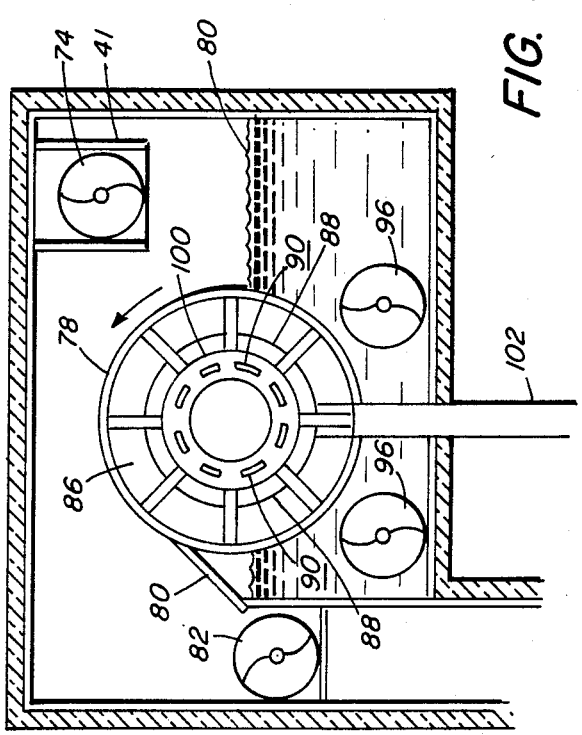
FIG. 2
FIG. 3

1

METHOD AND APPARATUS FOR OBTAINING A CONCENTRATED EXTRACT FROM LIQUID SMOKE

This is a continuation of application Ser. No. 347,907, filed Feb. 11, 1982, now abandoned.

BACKGROUND OF THE INVENTION

1. Field of the Invention

The present invention relates to methods and apparatuses for separation of solvent crystals from a fluid containing a solute and, more particularly, is directed towards methods and apparatuses for producing a concentrated extract from an ice crystal-fluid solution such as a liquid smoke solution by suction separation of the ice crystals and fluid.

2. Description of the Prior Art

U.S. Pat. Nos. 3,445,248 and 3,873,741 disclose methods for producing a liquid smoke product. U.S. Pat. No. 2,765,235 describes a method and apparatus for the separation of ice crystals from a fluid juice. The ice crystal-fluid juice is fed to a moving screen belt which is subjected to a vacuum pressure. The juice is drawn through the belt and deposited in one chamber for recycling and the ice crystals are deposited in another chamber. A need has arisen for an improved method and apparatus for separating of ice crystals from a fluid.

SUMMARY OF THE INVENTION

It is an object of the present invention to provide an improved method and apparatus for separating a crystal solvent from a crystal-fluid solution.

It is a further object of the present invention to provide a method and apparatus for collecting a concentrated liquid smoke extract by suction separation of an ice crystal solvent and a solute fluid containing the extract. The apparatus includes a drum that is rotatably mounted in a separation tank. The drum has a plurality of radially disposed compartments that are opened at the drum surface, a filter medium covering the compartment openings. A vacuum source is sequentially connected to selected ones of the compartments as the drum is rotated to create a suction for drawing the ice crystal-fluid solution through the filter medium. The ice crystals are captured by the filter medium and the fluid passes therethrough. A blade scrapes the ice crystals off the filter medium and deposits them in a heat exchanger. The fluid passes through ports in the drum and is collected for further concentration processing.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 2 is a side elevation of the separation chamber of FIG. 1; and

FIG. 3 is a front elevation of the separation chamber of FIG. 1.

DETAILED DESCRIPTION OF THE PREFERRED EMBODIMENTS

Figure 1:
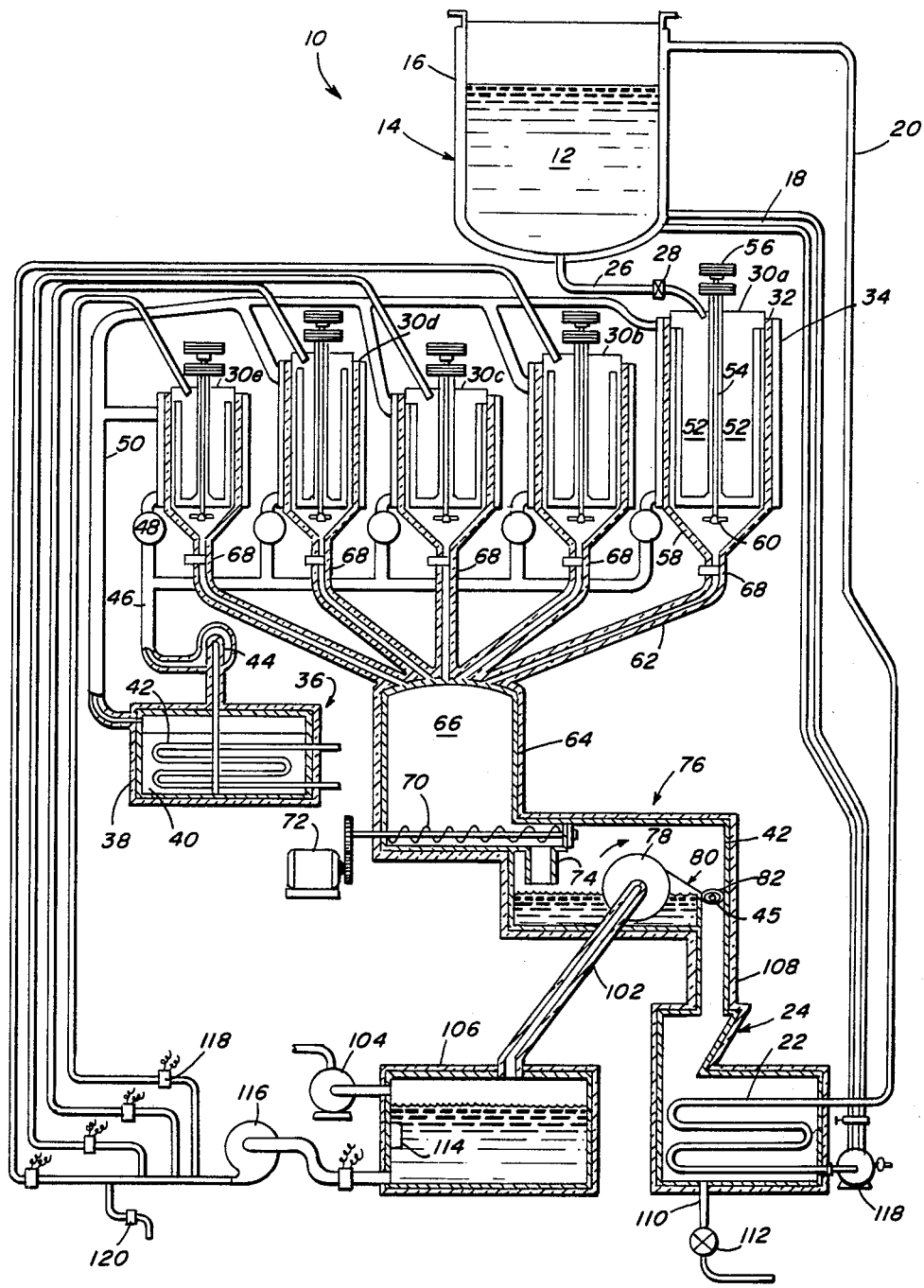
FIG. 1 is a schematic diagram of a system for suction separation of a concentrated extract embodying the present invention.

Referring now to the drawings, particularly FIG. 1, there is shown an apparatus 10 for separation of solvent crystals from an aqueous solution 12 containing the crystals and a solute fluid, solution 12 being held in a tank 14 having a jacket 16. A refrigerated liquid enters jacket 16 through a line 18 and exits therefrom through a line 20 which is connected to a heat exchanger 22 in an ice receptacle 24. The refrigerated solution 12 in tank 14 is discharged through a line 26 and a valve 28, for example an electrically controlled valve, into a tank 30 with a freezing jacket 32 and insulation 34. Tank 30a and tanks 30b through 30e which are constructed similar to tank 30a are connected to a refrigerating system 36 which includes a tank 38, a refrigerating liquid 40 and a coil 42. A pump 44 circulates refrigerating liquid 40 through a line 46 and thermostatically controlled valves 48 into freezing jackets 32 of tanks 30a–30e. The refrigerating liquid 40 passes through a return line 50 and enters tank 38. Each tank 30a–30e is provided with vertical and horizontal agitator scraper blades 52 that are on a shaft 54 which is connected to a motor driven pulley system 56. In addition, each tank 30a–30e is provided with a bottom chamber 28 having a propeller agitator 60 which rotates counterclockwise from agitator-scraper blades 52. In the illustrated embodiment, propeller 60 operates at 600 to 800 RPM and has an 18° pitch and agitator-scraper blades 52 rotates at approximately 125 RPM. The refrigerated aqueous solution in each tank 30a–30e flows through a discharge line 62 into a tank 64 having an internal chamber 66. A control valve 68 which is provided for each of the tanks 30a–30e controls the sequence at which the refrigerated aqueous solution flows out of tanks 30a–30e. Tank 64 is provided with a conveyor 70, for example an auger, which is driven by a motor 72. Auger 70 transfers the refrigerated aqueous solution which is in the form of a slush from chamber 66 through a port 74 and into an insulated separation tank 76.

As best shown in FIGS. 2 and 3, separation tank 76 includes a drum 78, a doctor blade 80 and a conveyor 82. Drum 78, which is driven by a motor 84, includes a plurality of radially disposed compartments 86, each compartment having a collection chamber 88. Each compartment 86 is opened at the periphery of drum 78, the opened portions being covered by a filter medium 92, for example a mesh screen or suitable cloth material. Conveyor 82, for example an auger, is driven by a motor 94. A pair of agitators 96, for example augers, are provided to constantly agitate the aqueous solution in tank 76, augers 96 being driven by a motor 98. Drum 78 is provided with a rotary valve 100 that is connected to chambers 88 through ports 90 and a line 102. A vacuum source 104, for example a vacuum pump, is connected to a tank 106 to which line 102 is also connected.

In operation, the aqueous solution 12 from tanks 30a–30e are fed to tank 64 and carried by auger 70 to port 74. The refrigerated aqueous solution 12, for example liquid smoke, carried by auger 70 falls through port 74 and into tank 76, the aqueous solution containing an ice crystal solvent and a liquid smoke solute. As viewed in FIG. 3, drum 78 is driven by motor 84 at approximately 4 to 6 RPM and rotates in a counterclockwise direction in the refrigerated solution of ice crystals and fluid. As drum 78 rotates, refrigerated aqueous solution 12 is drawn through filter medium 92 as a result of the suction created by vacuum pump 104 which is connected to rotary valve 100. The ice crystals adhere to the surface of filter medium 92 and the fluid passes into compartments 86. The fluid in compartments 86 then passes through ports 90 in rotary valve 100 into collection chambers 88. Ports 90 are so arranged in rotary valve 100 that the port which communicates with the particular chamber 88 is open to the chamber when compartments 86 associated with the chamber is below the solution level in tank 76. The collected fluid flowing through ports 90 and line 102 are deposited into collection tank 106. When the liquid solute reaches a predetermined concentration as measured by sensors 114, it is fed selectively by a pump 116 through valves 118 to tanks 30a–30e for further processing or through a valve 120 to storage tanks (not shown).

The ice crystals are scraped off filter medium 92 when that portion of filter drum 78 is no longer under vacuum pressure. After the ice crystals have been scraped off, they fall onto auger 82 which operates as a conveyor and are transported to heat exchanger 24 through port 108. Heat exchanger 24 is drained through a line 110 and a valve 112. The refrigerating liquid that is cooled by heat exchanger coil 22 is transmitted by a pump 118 into line 18.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method for obtaining a concentrated liquid smoke extract by separating solvent ice crystals from a refrigerated liquid smoke solution containing ice crystals and a liquid smoke solute, said method comprising the steps of:
   (a) forming a liquid smoke slush and placing the slush in a tank;
   (b) rotating a multiple compartment drum within said tank, said compartments having openings at the outer surface of said drum, said openings sequentially immersed into and withdrawn out of the liquid smoke slush as said drum is rotated, a filter medium covering said openings;
   (c) applying suction to each said compartment only when said compartment is immersed in said solution;
   (d) capturing the solvent ice crystals on said filter medium by drawing the liquid smoke slush through said filter medium only when said suction is applied to said compartment associated with said filter medium, a concentrated liquid smoke extract flowing into said compartment;
   (e) scraping said captured crystals from said filter medium; and
   (f) transmitting the concentrated liquid smoke extract in said compartments to said tank for recycling.

2. A method for obtaining a concentrated liquid smoke extract from a refrigerated slush containing ice crystals and a liquid smoke solute, said method comprising the steps of:
   (a) forming a liquid smoke slush and placing the slush in a tank having an internal chamber that is configured to receive refrigerated slush;
   (b) rotating a multiple compartment drum within said tank, said compartments being radially disposed and having openings at the outer surface of said drum, said openings sequentially immersed into and withdrawn out of the slush as said drum is rotated, a filter medium covering said openings;
   (c) creating a suction only in immersed compartments, said suction drawing the slush through said filter medium as said compartments are sequentially immersed in said solution;
   (d) capturing the ice crystals on said filter medium as the slush is drawn through said filter medium, a concentrated liquid smoke extract flowing into said compartment as the slush is drawn through said filter medium;
   (e) scraping the captured ice crystals from said filter medium; and
   (f) collecting the concentrated liquid smoke in a collection tank.

* * * * *